United States Patent [19]

Sayce

[11] 3,989,512

[45] Nov. 2, 1976

[54] PLASMA HEAT TREATMENT MEANS AND METHOD

[75] Inventor: Ian George Sayce, Hampton, England

[73] Assignee: National Research Development Corporation, London, England

[22] Filed: June 4, 1975

[21] Appl. No.: 583,688

[30] Foreign Application Priority Data

June 7, 1974 United Kingdom............... 25415/74

[52] U.S. Cl..................................... 75/11; 13/9 R; 75/10 R; 219/121 P; 423/335; 423/539; 264/15

[51] Int. Cl.².......................... C21C 5/52; H05B 7/18

[58] Field of Search................................. 75/10–12, 75/65 EB; 219/121 P; 423/335, 539

[56] References Cited

UNITED STATES PATENTS

| | | | |
|---|---|---|---|
| 3,480,426 | 11/1969 | Neuenschwander................ | 75/10 R |
| 3,843,351 | 10/1974 | Smith................................... | 75/10 R |

Primary Examiner—P. D. Rosenberg
Attorney, Agent, or Firm—Finnegan, Henderson, Farabow & Garrett

[57] ABSTRACT

A heater assembly comprising cathodic plasma generating means for generating a column of plasma, a plurality of anodic plasma torches the outlets of which are symmetrically disposed about the axis of the column and circuit means for energizing said generating means and said torches, the arrangement being such that in operation a current is passed simultaneously between the generating means and each of the torches by way of said column and jets of plasma from said outlets which merge with said column. A method for effecting the chemical or physical modification of a particulate material, in which the material is heated in a high enthalpy zone including a plasma column through which current passes from cathodic plasma generating means simultaneously to each of a plurality of anodic plasma torches the outlets of which are symmetrically disposed about the axis of the column, said zone also including the region of confluence of the column with jets of plasma from the torches.

27 Claims, 4 Drawing Figures

PLASMA HEAT TREATMENT MEANS AND METHOD

The present invention relates to the heat treatment of particulate materials.

Many chemical and physical transformations require particulate material to be heated to a high temperature. Such transformations include particle fusion (spheroidization), preparation of compound refractories or glasses, decomposition of metallic ores, vaporization of refractory materials and reduction of metallic compounds. The products of such transformations are often required in particulate form and this may be achieved by subjecting individual particles of a feedstock to heat treatment.

For some purposes the feedstock may be adequately treated by a chemical flame enclosed by a furnace, whilst for others where higher temperatures are required, heat may be electrically generated by an arc between carbon electrodes. Undesirable erosion of carbon generally occurs, however, with carbon contamination of the product in certain cases.

Heating apparatus has now been devised which is capable of providing a zone of high enthalpy in a furnace for the transformation of particulate materials, whilst obviating significant electrode erosion and contamination of the product.

According to the present invention, a heater assembly comprises cathodic plasma generating means for generating a column of plasma, a plurality of anodic plasma torches the outlets of which are symmetrically disposed about the axis of the column and circuit means for energising said generating means and said torches, the arrangement being such that in operation a current is passed simultaneously between the generating means and each of the torches by way of said column and jets of plasma from said outlets which merge with said column.

The present invention also includes within its scope a method for the heat treatment of particulate material.

Accordingly, the present invention further comprises a method for effecting the chemical or physical modification of a particulate material, in which the material is heated in a high enthalpy zone including a plasma column through which current passes from cathodic plasma generating means simultaneously to each of a plurality of anodic plasma torches the outlets of which are disposed symmetrically about the axis of the column, said zone also including the region of confluence of the column with jets of plasma from the torches.

The cathodic plasma generating means may be provided by a single electrode provided with an outlet for gas, for example by a plasma torch, or a gas-shielded non-consumable electrode, the outlet being disposed on the axis of the plasma column. Alternatively a plurality of such electrodes may be employed, which are so arranged as to produce jets of plasma which merged to form the column, in which case the outlets of the electrodes are generally symmetrically disposed about the axis of the plasma column produced by said jets.

It is generally preferable for particulate material to be heat treated in the high enthalpy zone to be injected into the plasma column at or near the origin thereof. When the column is produced from a single cathode, the material is conveniently injected by way of a nozzle adjacent the electrode tip, which nozzle is preferably annular and surrounds the tip. The material is generally conveyed to the nozzle and thence to the plasma column in a carrier gas. When a plurality of cathodic electrodes is employed, however, it is convenient to inject the material into the column at the region of confluence of the plasma jets forming the column.

Although the outlets of the anodic plasma torches may be so disposed that the plasma jets emerge therefrom in a direction perpendicular to the column axis, it is generally preferable for the axes of the latter jets to make a more oblique angle with the column axis so that the jets have a component of motion in the same sense as that of the plasma in the column and merging is smooth. Whilst the departure from the perpendicular disposition may be as great as 45°, it is preferably between 10° and 20°.

An advantage of the present invention is the facility for ready adjustment of the geometry of the assembly, even during operation if required. Another is that by employing plasma torches, these components of the assembly may be withdrawn to some distance from the zone of high enthalpy and contact of hot particles with such components may be avoided. Such contact could, of course, be deleterious both to the materials of construction of the assembly, and to the desired reaction and reaction products.

In a preferred variation, the invention comprises a single cathode from which an arc is struck to three or more anodic "plasma electrodes". It will be appreciated that the term "plasma electrode" is used to describe an electrode consisting of the conducting stream of gas (of plasma jet) which issues from a plasma torch. When used as a plasma electrode, this conducting stream may be caused to transfer current to or from the plasma torch (as in plasma cutting and welding) and thus the plasma electrode represents a continuously replaced gaseous electrode. Its use as anode in the present invention permits the withdrawal of the metallic components away from the hot and corrosive conditions of the main treatment zone, and ensures that the majority of the particles being treated pass through the reaction zone without contacting such components.

Pilot ores initially generated within the plasma torches which enable jets of plasma to be projected therefrom to merge with the plasma column and establish the zone of high enthalpy, are maintained during treatment of the particulate material to minimise the risk of plasma extension. The roots of the internal pilot ores of the main transferred arc are located within the torch in a region purged with inert gas.

The operating characteristics of the assembly may be adjusted in several ways. The size, shape and electrical characteristics of the plasma may be adjusted by movement of the electrodes after initiation of the arc. The nature and flow of gas to the plasma anodes and the sheath gas introduced around the cathode, or cathodes, may also be adjusted. The gas used is normally a gas which will not attack the hot metal in the region of the arc roots, argon or nitrogen being preferred.

The gas or gases introduced elsewhere in the system including the gas used to carry the particulate feed stock into the plasma may be varied widely and even gases corrosive to hot metal may be employed. Thus, the gas which forms the greater part of the main plasma column may be oxidising, reducing or contain halogens etc., but, by virtue of the use of plasma electrodes, corrosion of the metallic components of the device is substantially avoided. In this way, the particles of the feed stock may be caused to react at high temperatures with the plasma-heated gases and emerge from the plasma zone as discrete particles to be cooled and collected or further treated by conventional means.

An advantageous feature of the present invention is the uniformity of heat treatment which it is possible to give to a stream of particles. Thus by ensuring that particles are injected uniformly into the plasma stream, and that the particles then pass through the continuous arc column afforded by the DC arc it is possible to subject the majority of the particles to an approximately uniform heat treatment. Such uniformity is not easily achieved in conventional DC arc heaters or heaters which employ AC arcs.

Examples of the applications of the present device include melting, vaporisation, or partial vaporisation, decomposition, oxidation and reduction.

Thus, if silicon dioxide is fed to the device in the form for example of crushed crystalline quartz powder, the particles of refractory oxide may be individually fused and on cooling yield a free flowing spheroidized powder consisting substantially of fused silica. In this case, it is convenient to use nitrogen as cathode shield gas, argon as plasma anode gas and air as particle carrier gas. The presence of oxygen in the main plasma serves to repress vaporisation of the hot silica particles.

In other cases it may be desirable to achieve vaporisation, e.g. to yield fine particle products, or partial vaporisation e.g. in recovery of valuable metals from slags or low grade concentrate. Examples of metals which may be recovered in this way include tin, lead and zinc. Thus, a low grade tin concentrate may be fed as a stream of fine particles born in a carrier gas stream into the plasma column. To increase the volatility of tin, primarily as stannous oxide and $(SnO)_x$ polymeric species, a mildly reducing plasma is used e.g. by addition to the system of hydrogen or a hydrocarbon gas in the appropriate stoichiometry. The individual particles of the tin concentrate are rapidly raised to a temperature in the region of 1600°–2000° C when rapid vaporisation of the valuable metal occurs. The spent slag droplets may be cooled and collected, while the vapour may be oxidised to yield a stannic oxide fume, free from major contamination by silica or iron present in the original feed stock. The use of excess reductant, or excessively high temperature is not only less efficient in this process, but results in contamination of the fume product. Thus, at high temperatures, or in a strongly reducing environment silicon species may be vaporised (mainly as SiO and $(SiO)_x$ polymeric species) leading to a product containing much silica.

An example of decomposition using this device is provided by the treatment of molybdenite ore. This ore consists of molybdenum disulphide, and if heated to temperatures above in excess of about 2000° C, sulphur vapour is evolved from the molten droplet and metallic molybdenum (solid or liquid) is formed. This process may be effected using the present device when it is preferable to employ an atmosphere of argon throughout the apparatus.

Numerous other examples of decomposition may be brought about using the apparatus, and many of these have application in metallurgical extraction procedures. Thus beryl ore may be treated to yield particles of beryllium aluminium silicate glass from which beryllium may subsequently be leached; zircon particles may be treated to yield a particulate product from which silica may be leached to leave particles of substantially pure zirconia, and chalcopyrite-containing ores may be treated to yield a particulate product from which the copper may be leached more radially than from the untreated ore.

Oxidation with the present invention is exemplified by the flash roasting of a metallic sulphide. Thus, a sulphide, e.g. copper, iron or lead sulphide may be passed at high rates through the device, in this case with a predominantly oxidising atmosphere to yield the metallic oxides, and sulphur dioxide. The latter will be cooled in high concentration, convenient for the production of sulphuric acid. Under suitable conditions, it may be possible to control this reaction so that only the oxidation of sulphur is brought about, and the metal may then be collected as a particulate or liquid product.

Finally, reduction e.g. of metallic oxide particles may be effected using the present invention. Thus, if iron oxide of controlled particle size is fed into the device in the presence of a reducing gas e.g. hydrogen, or preferably a hydrocarbon gas, reduction of the oxide takes place and discrete particles of metal result. Again, partial reduction may be required as in the treatment of ilmenite ($FeO . TiO_2$). This ore occurs naturally as fine particles which may be fed through the transferred arc heater in a reducing plasma, when discrete particles containing metallic iron and a titania-rich residue result. A relatively pure titania may be obtained by removal of this iron e.g. by chlorination, or by dissolution in acid.

Embodiments of the present invention will now be described by way of example only with reference to the accompanying drawings of which:

Figure 1:
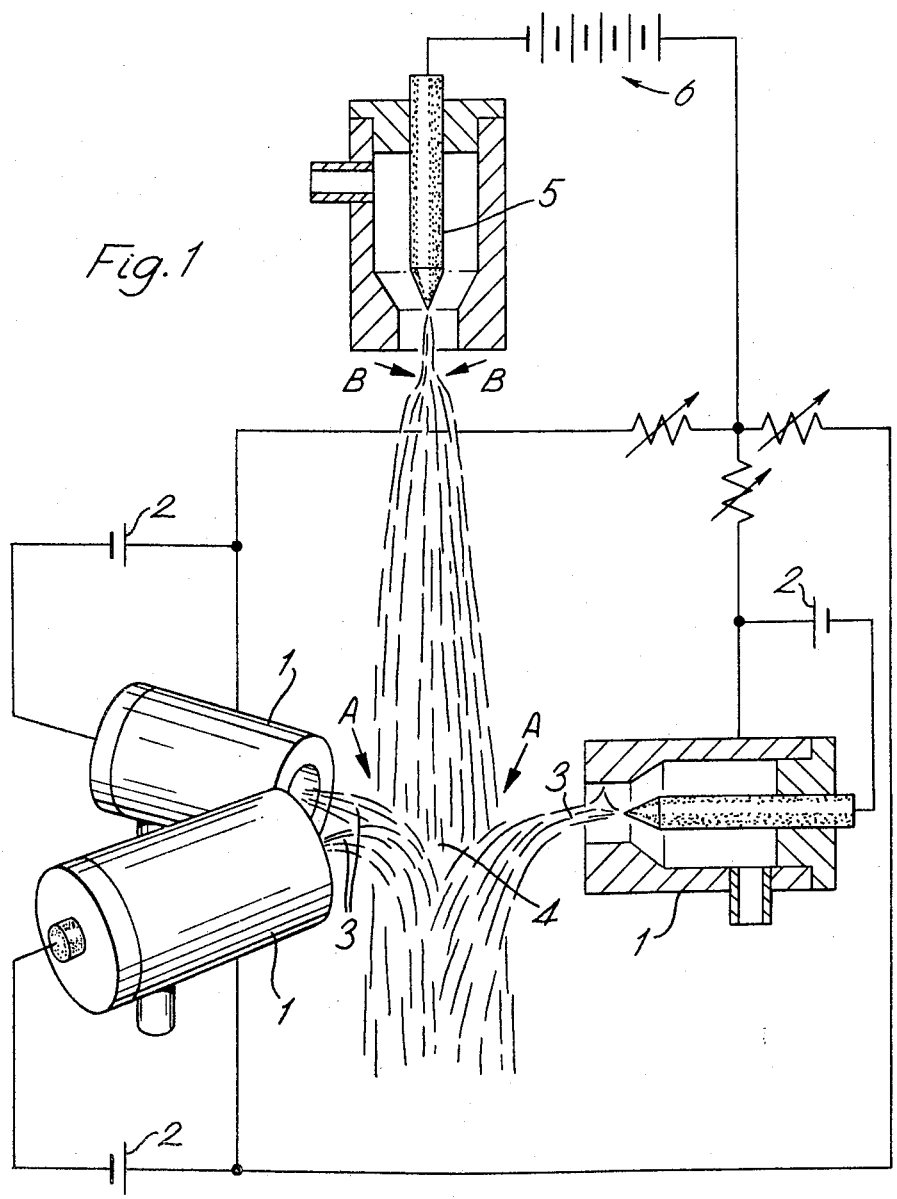
FIG. 1 is a schematic representation of a first heater assembly suitable for association with a furnace.

FIG. 1 shows a first heater assembly in which plasma torches, 1, are arranged about the axis of the device lying in a horizontal plane. A pilot arc is maintained within each of these torches by means of separate electrical generators, 2, and gas is fed through the torches so that a plasma jet 3 emerges from the nozzle of each torch. The three jets of plasma are arranged to merge in the centre of the apparatus and provide a conducting region of confluence 4 to which an arc may be struck from the cathode 5 which is supported on the axis of the device vertically above region 4. Although in FIG. 1 the main cathode 5 consists of a gas-shielded water-cooled tungsten electrode, it may instead take the form of a plasma torch used, after arc initiation, in the so-called transferred arc mode, or it may comprise a suitable water-cooled gas-shielded non-consumable metal cathode or alternatively some other form of cathode may be employed.

To operate the device, gas is introduced via plasma torches 1 shielded by cathode 5, and if required at other points. The pilot arcs are then struck in the anodic torches 1. Cathode 5 is then lowered into the region of confluence 4, and an arc is struck from the cathode to this plasma. A high voltage spark may be employed to aid striking of this arc. After initiation of the main arc the cathode 5 may be raised to its operating position so lengthening the plasma column and increasing the potential drop along this column. If required to increase the size of region 4, the plasma jets from torches 1 may also be withdrawn from the axis of the device. In operation the plasma then takes the form shown schematically in FIG. 1. The majority of the power dissipated in the device is dissipated in the vertical arc column. Electrons from the main electrical generator 6 leave the major cathode, travel down the column to the three plasma anodes 1 and return via the plasma torches 1 to the main generator 6.

The present embodiment is particularly intended for treating particulate or powdered material and the powder to be treated may be introduced at various points, but certain difficulties arise owing to the fact that a streaming plasma represents a flow of viscous gas into which the injection of a stream of particles is not easy. Satisfactory introduction of powder into the centre of a plasma column can only be effected at certain regions of the plasma column. Two such regions are shown at A and B in FIG. 1. At A the plasma columns from the primary cathode and the plasma anodes merge and efficient introduction of powder in this region is possible, but in a preferred mode of operation the powder is introduced in region B, the region of constriction of the cathode jet. This mode of introduction employs a well known principle first discussed in detail by Maecker who showed that constriction of a current-carrying arc column resulted, by magnetohydrodynamic effects, in a pressure drop within the arc column. Gas therefore may be drawn into the arc column in the region of the constriction. Advantage may be taken of this effect in the region of the cathode to the principal arc column where, by virtue of the small size of the cathode spot, the arc is inevitably constricted; the introduction of cold gas and in particular cold gas laden with particles is thereby facilitated, and even enhances the constriction and the resulting Maecker effect.

Figure 2:
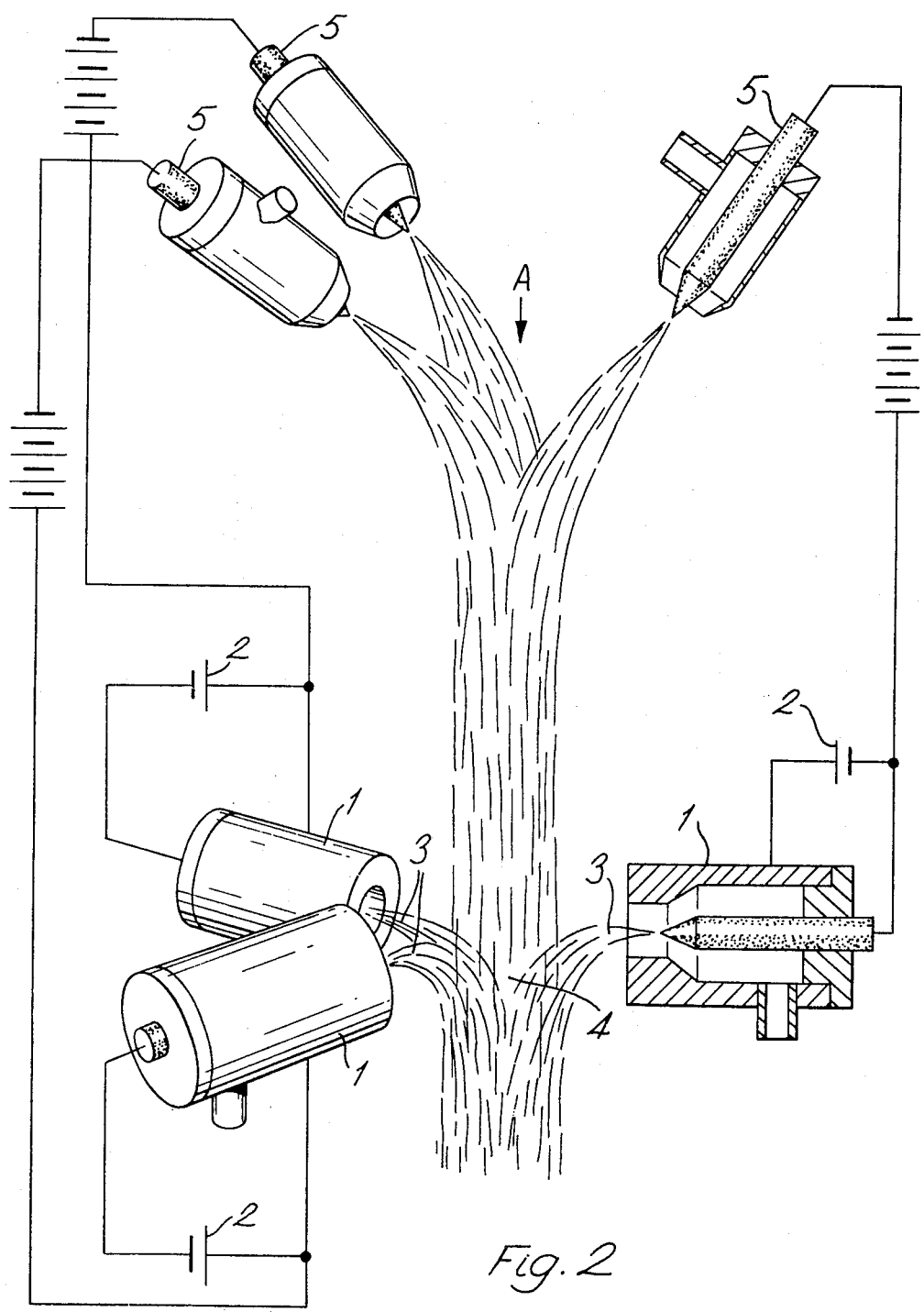
FIG. 2 is a schematic representation of a second heater assembly.

FIG. 2 shows a second heater assembly. In this case the anodic portion of the heater comprises, as in the first heater, a number of plasma torches 1 arranged about an axis coincident with that of the furnace, but the cathodic part of this modification comprises three individual gas-shielded cathodes, each of which produces a jet of plasma directed toward the anodic plasma zone. A convenient electrical circuit for this arrangement is also shown in FIG. 2. Initiation of the principal arc column is facilitated by bringing the cathodes into close proximity with the anodic plasma electrode. After initiation of the plasma column the cathodes are withdrawn.

When in operation, a stream of plasma leaves each of the individual cathodes as a high velocity jet. Owing to the mutual attraction of conductors carrying like current, these cathodic streams merge at point A in FIG. 2. This represents a low pressure zone into which powder feed stock may readily be fed, and such feed stock subsequently enters the principal arc column where the required process is brought about.

While this arrangement requires a somewhat more complicated electrical circuit it had the advantage that the problems of uniform feeding of powder into the plasma is greatly simplified.

Figure 3:
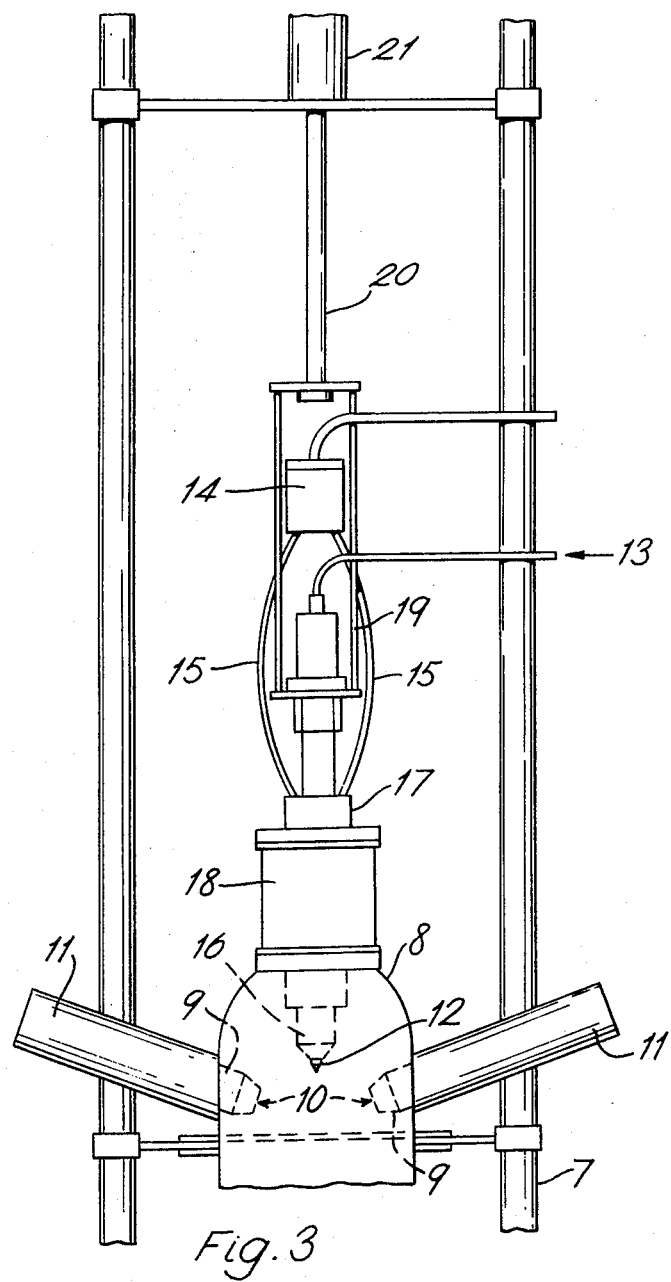
FIG. 3 is a diagrammatic representation of part of a furnace rig comprising a third heater assembly.

Referring now to FIG. 3, a rig of tubular scaffolding 7 supports a water-cooled stainless steel reactor housing (8, part only shown), into the interior of which extends three anodic plasma torches 9 (only two shown) the outlets of which 10 are symmetrically disposed at an angle of 120° about the axis of the housing. The torches 9 are slidably received by hermetic seals (not shown) within tubular supports (11) mounted on the housing, so that the torches are mutually adjustable. Each torch 9 is tilted downward from the horizontal at 20° and is so constructed that in operation the anodic roots of the internal pilot arcs and of the main transferred arc are located within the torches in a region purged with inert gas.

A cathode (not shown) in the form of a rod terminating in a tungsten tip 12 is radially spaced from a copper shield by which it is surrounded to provide an annular conduit for flow of a cathode sheath gas to the tip 12, which conduit communicates at the upper end of the cathode with gas supply tubing 13. The shield (not shown) is spaced, near the lower end of the cathode, from a surrounding water-cooled nozzle to provide an annular conduit for transfer of powder loaded carrier gas from a three-way powder splitter 14, by way of three tubes connected thereto (15, only two shown) and three inlets symmetrically spaced around the nozzle and extending therethrough, to the cathode tip 12. The cathode, shield and nozzle form a cathode assembly 15 which is slidably mounted by a gas tight seal on the axis of the housing above the anodes within a water-cooled metal cylinder 17 which is supported by a silica tube 18 mounted on the reactor housing 8 by which tube 18 the cylinder 17 is insulated from the housing 8. The cathode assembly 16 is mounted near its upper end on a frame 19 which is connected to a hydraulic ram 20 received in a cylinder 21 for raising and lowering the cathode assembly 16 with respect to the anodes 9. The reactor housing 8 extends downwardly into a steel tube (not shown) which terminates in a particle collector which takes the form of a cyclone or spray quenching device.

The heater assembly shown in FIG. 3 is operated by first initiating pilot arcs in each of the anodic torches 9. The cathode assembly 16 is then lowered into the vicinity of the anodic plasma jets and with argon flowing in the cathode sheath an arc is struck to the three anodes 9. The cathode assembly 16 is then raised to its operating position and the sheath gas may at this stage be changed e.g. from argon to nitrogen. Powdered feed stock is introduced into the plasma column from the cathode assembly 16 by way of the powder splitter 14 and cathode tip 12 at which the streams converge to form an annular flow which is such that powder is introduced at high velocity into the low pressure region of the arc column.

Figure 4:
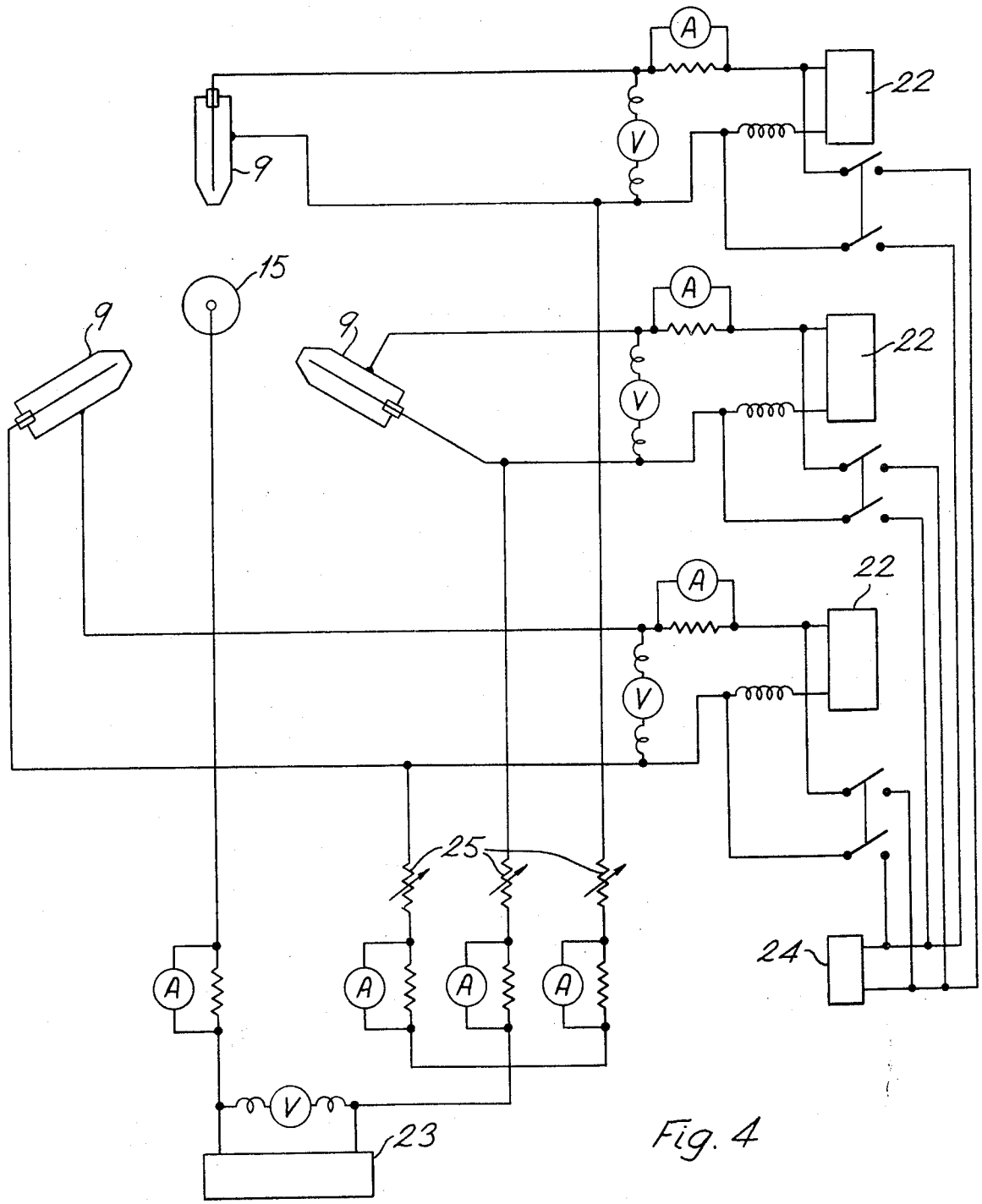
FIG. 4 is a diagrammatic representation of circuitry suitable for use in operating the heater shown in FIG. 3.

FIG. 4 shows a circuit suitable for operating the assembly shown in FIG. 3. In the figure, the anodic torches 9 are energised by NMR 650 (British Oxygen Ltd.) welding generators 22 and the cathode assembly 15 by two plasma power sources 23 type PPS 320/185 (Hirst Electric) connected in parallel. Parts of the circuit indicated by the numerals 24 and 25 represent respectively a HF spark unit and water-cooled ballast resistors.

The invention is further illustrated by the following Examples of applications of the apparatus hereinbefore described.

EXAMPLE 1

Melting and Spheroidisation of Silica

In this application silica is subjected to heat treatment in the apparatus shown in FIG. 3, the treatment being carried out in an oxidising atmosphere in order to suppress vaporisation of the oxide.

First, three anodic pilot arc torches are initiated, using argon (4.6 l/min.) at 24 V, 250 A (6 kW) i.e. at a total pilot arc power 18 kW. The cathodic arc is then struck and the cathode withdrawn, following which the cathode sheath gas is changed to nitrogen (20 l/min.) and silica powder (150 g/min.) suspended in a stream of air (30 l/min.) is introduced via the annular feed system. The main arc then operates at 100 V, 500 A (50 kW). The powder in this case is totally spheroidised and converted to a glassy product for an energy requirement of 7.6 kW h/kg.

EXAMPLE 2

Dissociation of Zirconium Silicate

Using the same apparatus zirconium silicate is spheroidised and dissociated into component oxides. The heater is operated with each pilot arc torch using argon (7.5 l/min.) at 24V, 300 A (7.2 kW) giving a total pilot arc power of 21.6 kW. With a cathode sheath gas flow of nitrogen (20 l/min.) zircon sand (180 g/min.) is introduced via the annular feed system suspended in a stream of air (39.5 l/min.). The main arc then operates at 104 V, 600 A (62.4 kW). The zircon sand which is collected on cooling is found to be completely dissociated having been converted to spherical particles containing a mixture of the component oxides in an uncombined state. In this experiment the overall power requirement is 7.8 kW h/kg.

EXAMPLE 3

Dissociation of Molybdenum Disulphide

In this case it is necessary to operate the heater in the absence of air or oxygen to prevent oxidation. The avoidance of carbon contamination is also necessary.

Pilot arc torches operating on argon (7.5 l/min.) are initiated at 24.V, 300 A (7.2 kW) giving a total pilot arc power of 21.6 kW. With a cathode sheath gas flow of argon (23 l/min.) molybdenum disulphide powder (176 g/min.) is then introduced via the annular feed system suspended in a stream of argon (36 l/min.). The main arc then operates at 70 V, 600 A (42.kW). Under these conditions feed is substantially spheroidised and approximately 50% dissociated into metallic molybdenum and sulphur vapour for an overall power requirement of 6 kW h/kg. of feed stock.

I claim:

1. A heater assembly comprising cathodic plasma generating means for generating a column of plasma, a plurality of anodic plasma torches the outlets of which are symmetrically disposed about the axis of the column and circuit means for energising said generating means and said torches, the arrangement being such that in operation a current is passed simultaneously between the generating means and each of the torches by way of said column and jets of plasma from said outlets which merge with said column.

2. An assembly according to claim 1 in which the plasma torches are so orientated that jets of plasma emerging therefrom merge with the plasma column obliquely.

3. An assembly according to claim 2 in which the plasma torch outlets are so orientated that the axes of plasma jets emerging therefrom are tilted from the perpendicular to the plasma column axis by 10° to 20°.

4. An assembly according to claim 1, comprising at least three anodic plasma torches.

5. An assembly according to claim 1, in which the cathodic plasma generating means is single.

6. An assembly according to claim 1, in which the cathodic plasma generating means comprises means for introducing a particulate material in a carrier gas to the origin of the plasma column.

7. An assembly according to claim 1, in which the cathodic plasma generating means comprises a plurality of cathodes for producing plasma jets, the cathodes being so disposed that the jets merge to form the column of plasma.

8. An assembly according to claim 1, in which the cathodic plasma generating means comprises one or more cathodes which are gas shielded and non-consumable.

9. An assembly according to claim 1, when associated with means for cooling particulate material heated by the assembly.

10. An assembly according to claim 1, when associated with a furnace enclosing the column and jets of plasma.

11. A method for effecting the chemical or physical modification of a particulate material, in which the material is heated in a high enthalpy zone including a plasma column through which current passes from cathodic plasma generating means simultaneously to each of a plurality of anodic plasma torches the outlets of which are symmetrically disposed about the axis of the column, said zone also including the region of confluence of the column with jets of plasma from the torches.

12. A method according to claim 11, in which the particulate material is injected into the plasma column at the origin thereof, from which column the material is carried into the high enthalpy zone.

13. A method according to either claim 11, in which the material is spheroidised by being heated in the high enthalpy zone and subsequently cooled.

14. A method according to claim 13, in which the material is silica and oxygen is present in the high enthalpy zone to suppress vaporisation of the silica.

15. A method according to claim 11, in which the material is dissociated in the high enthalpy zone.

16. A method according to claim 15, in which the material comprises zirconium silicate which is dissociated into a mixture of zirconia and silica in the high enthalpy zone.

17. A method according to claim 15, in which the material comprises molybdenum disulphide which is dissociated into a mixture containing molybdenum and sulphur in the high enthalpy zone.

18. A method according to claim 15 in which the material comprises beryl ore which is dissociated into beryllium aluminium silicate in the high enthalpy zone.

19. A method according to claim 15, in which the material comprises a chalcopyrite ore which is heated in the high enthalpy zone and subsequently cooled to yield a particulate product.

20. A method according to claim 11, in which the material is heated in the high enthalpy zone to effect vaporisation of at least part thereof.

21. A method according to claim 20, in which the material is heated on the high enthalpy zone to effect recovery of a metal compound present in the material by volatilisation thereof.

22. A method according to claim 21, in which the compound is of tin.

23. A method according to claim 11, in which the material is oxidised in the high enthalpy zone, which contains an oxidising gas.

24. A method according to claim 23, in which the material comprises a sulphide of copper, lead or tin which is oxidised to an oxide thereof and sulphur dioxide.

25. A method according to claim 11, in which at least part of the material is reduced in the high enthalpy zone which contains a reducing gas.

26. A method according to claim 25, in which the material comprises an oxide of iron which is reduced to the metallic state in the high enthalpy zone by the reducing gas.

27. A method according to claim 25 in which the material comprises ilmenite which is reduced to titinia and metallic iron in the high enthalpy zone.

* * * * *

UNITED STATES PATENT AND TRADEMARK OFFICE
CERTIFICATE OF CORRECTION

PATENT NO. : 3,989,512
DATED : November 2, 1976
INVENTOR(S) : Ian George Sayce

It is certified that error appears in the above-identified patent and that said Letters Patent are hereby corrected as shown below:

Column 1, line 46, "current passes" should read -- electrons pass --.

Column 2, line 31, "of" (second occurrence) should be -- or --;

line 42, "ores" should be -- arcs --;

line 47, "extension" should be -- extinction --;

line 47, "ores" should be -- arcs --.

Column 4, line 2, "radially" should be -- readily --;

line 60, "shielded by" should be -- by shielded --.

Column 5, line 59 "had" should be -- has --;

line 61, "is" should be -- are --.

Signed and Sealed this

Thirty-first Day of May 1977

[SEAL]

Attest:

RUTH C. MASON
*Attesting Officer*

C. MARSHALL DANN
*Commissioner of Patents and Trademarks*